US007711832B1

(12) United States Patent
Champion et al.

(10) Patent No.: US 7,711,832 B1
(45) Date of Patent: May 4, 2010

(54) ENABLING EXISTING DESKTOP APPLICATIONS TO ACCESS WEB SERVICES THROUGH THE USE OF A WEB SERVICE PROXY

(75) Inventors: Kerry Scott Champion, Menlo Park, CA (US); May H Huang, Fremont, CA (US)

(73) Assignee: Actional Corporation, Bedford, MA (US)

( * ) Notice: Subject to any disclaimer, the term of this patent is extended or adjusted under 35 U.S.C. 154(b) by 1159 days.

(21) Appl. No.: 10/903,405

(22) Filed: Jul. 30, 2004

Related U.S. Application Data

(60) Provisional application No. 60/504,707, filed on Sep. 22, 2003.

(51) Int. Cl.
*G06F 15/16* (2006.01)
*G06F 15/173* (2006.01)
(52) U.S. Cl. .................. 709/228; 709/202; 709/203; 709/218; 709/229
(58) Field of Classification Search ............... 709/203, 709/206, 218, 220, 221, 229, 202, 217; 719/316, 719/318
See application file for complete search history.

(56) References Cited

U.S. PATENT DOCUMENTS

| | | | |
|---|---|---|---|
| 6,801,604 B2 | 10/2004 | Maes et al. | |
| 6,807,636 B2 | 10/2004 | Hartman et al. | |
| 7,000,238 B2 * | 2/2006 | Nadler et al. | 709/217 |
| 7,426,733 B2 * | 9/2008 | Otake | 709/219 |
| 2001/0056476 A1 * | 12/2001 | Benayoun et al. | 709/218 |
| 2002/0026473 A1 | 2/2002 | Gourrad | |
| 2002/0161826 A1 | 10/2002 | Arteaga et al. | |
| 2003/0005174 A1 | 1/2003 | Coffman et al. | |
| 2003/0061282 A1 * | 3/2003 | Ebata et al. | 709/203 |
| 2003/0061317 A1 * | 3/2003 | Brown et al. | 709/221 |
| 2003/0061404 A1 | 3/2003 | Atwal et al. | |
| 2003/0074579 A1 | 4/2003 | Della-Libera et al. | |
| 2003/0126236 A1 * | 7/2003 | Marl et al. | 709/220 |
| 2003/0195762 A1 * | 10/2003 | Gleason et al. | 705/1 |
| 2004/0019645 A1 * | 1/2004 | Goodman et al. | 709/206 |

(Continued)

OTHER PUBLICATIONS

Barton, J.J. et al., "SOAP Messages with Attachments," World Wide Web Consortium, W3C Note, Dec. 11, 2000. [online] [Retrieved on Jul. 24, 2003] Retrieved from the Internet<URL:http://www.w3.org/TR/SOAP-attachments>.

(Continued)

*Primary Examiner*—Quang N. Nguyen
(74) *Attorney, Agent, or Firm*—Fenwick & West LLP

(57) ABSTRACT

The present invention enables desktop applications to access web services through Plug-ins and a Web Service Proxy Server. An administrator registers a web service by providing the URL of the WSDL file of the web service. The target desktop applications and the operations are identified using the WSDL file. Operations that are not compatible with the desktop applications are removed from a published list of operations. The administrator appends additional formatting information, communication standards and security policies to the WSDL file. A user accessing the web services is first authenticated and authorized. Thereafter, the user accesses the web services through Web Service Proxy Server. The communication with the web services complies with the standards and security policies specified in the WSDL files. The output data obtained from the web services are presented using template documents. These template documents are generated based on the formatting information provided in the WSDL files.

32 Claims, 9 Drawing Sheets

U.S. PATENT DOCUMENTS

| | | | |
|---|---|---|---|
| 2004/0083482 A1* | 4/2004 | Makagon et al. ............ | 719/316 |
| 2004/0128392 A1* | 7/2004 | Blakley et al. .............. | 709/229 |
| 2004/0128393 A1* | 7/2004 | Blakley et al. .............. | 709/229 |
| 2005/0111653 A1* | 5/2005 | Joyce et al. ................. | 719/318 |
| 2007/0022155 A1* | 1/2007 | Owens et al. ............... | 709/202 |

OTHER PUBLICATIONS

Biron, P.V. et al., "XML Schema Part 2: Datatypes," World Wide Web Consortium, W3C Recommendation, May 2, 2001, [online] [Retrieved on Jul. 11, 2003] Retrieved from the Internet<URL:http://www.w3.org/TR/xmlschema-2>.

Box, D. et al., "Simple Object Access Protocol (SOAP) 1.1," World Wide Web Consortium, W3C Note, May 8, 2000, [online] [Retrieved on Jul. 23, 2003] Retrieved from the Internet<URL:http://www.w3.org/TR/2000/NOTE-SOAP-20000508/>.

U.S. Appl. No. 10/015,501, filed Dec. 11, 2001, Champion.

U.S. Appl. No. 10/015,502, filed Dec. 11, 2001, Champion.

U.S. Appl. No. 10/612,399, filed Jul. 1, 2003, Champion.

Bray, T. et al., Extensible Markup Language (XML) 1.0 (Second Edition), World Wide Web Consortium, W3c Recommendation, Oct. 6, 2001, [online] [Retrieved on Jul. 11, 2003] Retrieved from the Internet<URL:http://www.w3.org/TR/REC-xml>.

Christensen, E. et al., "Web Services Description Language (WSDL) 1.1," World Wide Web Consortium, W3C Note, Mar. 15, 2001 [online] [Retreived on Jul. 11, 2003] Retrieved from the Internet<URL:http://www.w3.org/TR/wsdl>.

Clark, J. et al., "XML Path Language (Xpath)," World Wide Web Consortium, W3C Recommendation, Nov. 16, 1999, [online] [Retrieved on Jul. 11, 2003] Retrieved from the Internet<URL:http://www.w3.org/TR/xpath>.

Clark, J., "XSL Transformations (XSLT) Version 1.0," World Wide Consortium W3C Recommendation, Nov. 16, 1999, [online] [Retrieved on Jul. 23, 2003] Retrieved from the Internet<URL:http://www.w3.org/TR/xslt>.

"COM: Component Object Model Technologies," Microsoft Corporation, 2006, [online] [Retrieved on Jul. 31, 2006] Retrieved from the Internet<URL:http://www.microsoft.com/com/default.mspx>.

"Component Object Model—Wikipedia, the free encyclopedia," Wikipedia®, [online] [Retrieved on Jul. 31, 2006] Retrieved from the Internet<URL:http://en.wikipedia.org/wiki/Component_Object_Model>.

Copyright © OASIS, 2001, "Oasis/ebXML Registry Information Model v1.0 DRAFT, OASIS/ebXML Registry Technical Committee," Jun. 27, 2001, [online] Retrieved from the Internet<URL:http://www.oasis-open.org/committees/regrap/documents/rimv1.0.doc>.

Copyright © UN/CEFACT and OASIS, 2001, "Message Service Specification, ebXML Transport, Routing & Packaging, Version 1.0," May 11, 2001, [online] Retrieved from the Internet<URL:http://www.ebxml.org/specs/ebMS.pdf>.

"CORBA® FAQ: CORBA® Basics," Object Management Group, Inc., 12997-2006, [online] [Retrieved on Jul. 31, 2006] Retrieved from the Internet<URL:http://www.omg.org/gettingstarted/corbafaq.htm>.

"Distributed Component Object Model, Wikipedia, the free encyclopedia," Wikipedia®, [online] [Retrieved on Jul. 31, 2006] Retrieved from the Internet<URL:http://en.wikipedia.org/wiki/Distributed_component_object_model>.

"Download Details: Microsoft Office XP Web Services Toolkit 2.0," Microsoft Corporation, 2006, [online] [Retrieved on Jul. 31, 2006] Retrieved from the Internet<URL:http://www.microsoft.com/downloads/details.aspx?familyid=4922060F-002A-4F5B-AF74-978F2CD6C798&displaylang=en>.

Fallside, D.C., "XML Schema Part 0: Primer," World Wide Web Consortium, W3C Recommendation, May 2, 2001, [online] [Retrieved on Jul. 11, 2003] Retrieved from the Internet<URL:http://www.w3.org/TR/xmlschema-0>.

"FINCAD XL," FINCAD®, 2005, [online] [Retrieved on Jul. 31, 2006] Retrieved from the Internet<URL:http://www.fincad.com/default.asp?id=2000&s=Products&n=Fincad%20XL>.

Merrick, P. et al., "Web Interface Definition Language (WIDL)," World Wide Web Consortium, Submitted to W3C Sep. 22, 1997, © 1997, webMethods, Inc., [online] [Retrieved on Aug. 11, 2003] Retrieved from the Internet<URL:http://www.w3.org/TR/NOTE-widl>.

Thompson, H.S. et al., "XML Schema Part 1: Structures," World Wide Web Consortium, W3C Recommendation, May 2, 2001, [online] [Retrieved on Jul. 11, 2003] Retrieved from the Internet<URL:http://www.w3.org/TR/xmlschema-1>.

* cited by examiner

ENABLING EXISTING DESKTOP APPLICATIONS TO ACCESS WEB SERVICES THROUGH THE USE OF A WEB SERVICE PROXY

RELATED APPLICATIONS

This application claims the priority of U.S. Provisional Patent Application No. 60/504,707 entitled "Enabling Existing Desktop Applications to Access Web Services Through the Use of a Web Service Proxy" by Kerry Scott Champion, and May H. Huang, filed on Sep. 22, 2003, which is incorporated by reference as if set forth herein in its entirety.

BACKGROUND

Most business organizations require that their computational resources and the required data be available wherever and whenever they are needed. It is also desired that the data be accessed using any desktop application in a platform independent manner. Once this accessibility is achieved, the organizations can share data, integrate their processes, and join forces to offer customized and comprehensive solutions to their end users.

Before the Internet gained popularity, most organizations stored their data in large databases handled by mainframes. Dumb terminals with no processing capability were used to connect to the mainframe. Mainframes were used to process the data and present the output using dumb terminals. The mainframes being extremely expensive were beyond buying capacity of most of the organizations.

Later years witnessed the evolution of distributed data processing techniques. These techniques allowed different computers to share data and also to allow one computer to control a process on another computer. The distributed data processing technique was more flexible and less expensive than mainframes. However, there are few disadvantages associated with distributed computing. Firstly, server computers are required to coordinate different computers to work towards a goal. Secondly, security is a concern in distributed computing as data is frequently transferred between different computers. Thirdly, the maintenance of a distributed network is complex as each computer has its own share of problems and errors.

With an increase in popularity of the Internet, much of the data is now available over the Internet in the form of web pages. Much of the data needed by the businesses is now accessible from a remote location using the Internet. The information is stored in centralized databases that serve a page at a time to individual users. Thus, the information is scattered in the form of web pages. The user needs to manually search many web pages to extract relevant data, which is resource intensive, inconvenient and time consuming.

In addition to sharing data, standalone applications and web services were developed to provide isolated functionality and data. Each application/web service has a specific format of accepting input and presenting output, implementing security policies for connecting with a client, etc. In order to access a web service, a user needs to satisfy all the requirements set forth by the web service. In other words, a client needs to be compatible with a web service in order to access it. Most of the times, a user needs to access many applications and web services to obtain the required information. For example, the user may need to collect data from one application or web service and provide it to another application or web service. In these cases, the client needs to be compatible with multiple web services and applications, which requires programming effort. Therefore, much time, cost and resources are expended in resolving these compatibility issues.

In order to address the compatibility issues and the manner in which business organizations and consumers use the Internet, a new converged computing model has evolved. This model aims at devising standard ways of building applications and processes to connect and exchange information over the Internet. Standards such as CORBA (Common Object Request Broker Architecture) and Microsoft's COM (Component Object Model) and DCOM (Distributed Component Object Model) were some of the attempts in this direction. However connecting and sharing information between different applications and processes gained momentum with the introduction of eXtensible Markup Language (XML) in 1996. XML is a flexible way to create common information formats and share both the format and the data between different applications and web services. Various XML-based ways of running procedures on remote machines and of sharing objects have evolved. Some of the most important developments have been the Simple Object Access Protocol (SOAP), Web Services Description Language (WSDL) and Universal Description, Discovery, and Integration (UDDI). SOAP is a way for a program running in one kind of operating system to communicate with a program in the same or another kind of an operating system. For example, using SOAP, a program running in Windows 2000 may communicate with another operating system such as Linux. WSDL is an XML-based language that is used to describe the services a business offers and to provide a way for individuals and other businesses to access those services electronically. UDDI is an XML-based registry for businesses worldwide to list themselves on the Internet. UDDI aims at streamlining online transactions by enabling companies to find one another on the Web and make their systems interoperable for e-commerce.

The advantages offered by XML are used by web services to provide services to various web users or collaboration systems in a platform independent manner. Web services provide a standard mechanism of publishing the interfaces of the computing resources on the network.

These web services available on web servers can be accessed by using various techniques. The user can avail these services by directly linking to the server via a web browser. A web browser is a customized application that supports web access capabilities for various collaboration systems. The data obtained from the web services needs to be collated and presented to the user in a suitable format. This collation and presentation is usually performed on desktop applications like collaboration tools. The data acquired from web services is accessed using various desktop applications. Today's standalone desktop applications rarely provide any capability in connecting and conversing with web services. For the few desktop applications that provide these capabilities, the capability is very limited. A complex programming effort is required in order to extend the capabilities of the desktop applications to access web services.

There exist few products in the prior art that allow existing desktop applications to access web services available on the Internet. One such product is Microsoft Office XP Web Services Toolkit 2.0 manufactured by Microsoft Corporation, Redmond Wash., USA. This product is used to access and utilize XML Web services. Web Service References Tool 2.0 is used in a client application to create a Microsoft Visual Basic Application (VBA) proxy class module from a WSDL file. This proxy class contains methods and program code that allow the user to invoke XML Web services. The user can further use this proxy class to write VBA macro/subroutines to access the web services.

Another product is Fincad XL 5 manufactured by FinancialCAD Corporation, Surrey, B.C., Canada. FinancialCAD Corporation provides customized plug-in for a MS Excel user to access its web services. The Fincad XL 5 plug-in provides spreadsheets that contain special Fincad XL 5 functions, called "remote functions". These functions provide programmatic access for Microsoft Excel spreadsheet users to the application services available to Fincad.net subscribers.

These products aid in accessing web services to a certain extent. However, one or more of the abovementioned products suffer from certain drawbacks. Firstly, the prior applications provide libraries/classes to enable access to web services. But, these applications need programming at the user's end, hence making the system difficult to use by people with little programming knowledge. Secondly, the interfaces provided by these products are predefined. This restricts the ability of the user to manipulate and compile data in a desired format. Thirdly, these products provide access only to a limited set of web services. This largely restricts the type of web services that can be accessed by the user.

Accordingly, there is a need for systems and methodology that allow existing desktop applications to access various web services available over the Internet. Also, there is a need for the system to be user friendly and involve no programming or scripting effort on user's part. Also, there is a requirement for a system that has provisions to present the output data received from the web services in a predefined format desired by the user. Also, in order to access all types of web services, there is a need for a system to ensure compatibility with web services, given the limits of the hosted desktop application. Further, there is a need for a system that facilitates sophisticated communication mechanisms that are originally supported (or not supported) by the desktop application. In addition, there is a need for a system that is not restricted to a specific set of web services.

SUMMARY

The present invention is directed to a system, a method and a computer program that extend the capabilities of desktop applications in discovering, connecting and conversing with web services.

An object of the present invention is to provide a system, a method and a computer program that enable a user to extend the capabilities of desktop applications in discovering, connecting and conversing with web services.

Another object of the present invention is to provide a system, a method and a computer program that enable a user to extend the capabilities of desktop applications in discovering, connecting and conversing with web services without any programming required on the user's part.

Another object of the present invention is to provide a system, a method and a computer program that generates pre-formatted template documents for presenting output data obtained from web services.

Another object of the present invention is to provide a system, a method and a computer program that enable communication mechanisms between desktop applications and web services that are not originally supported by the desktop applications.

Yet another object of the present invention is to provide a system, a method and a computer program that insure compatibility of the desktop application with web services, given the limitations of the desktop applications.

To attain the above-mentioned objectives, the present invention provides a system, a method and a computer program that enable desktop applications to access web services through a combined use of Plug-ins and a Web Service Proxy Server. A Plug-in corresponding to a particular desktop application is installed at the desktop. The desktop application interacts with the Plug-in and the Plug-in in turn interacts with the Web Service Proxy Server. The Web Service Proxy Server acts as a proxy server for accessing multiple web services.

The system in accordance with the present invention provides access to the web services that are registered with the system. To register a web service with the system, an administrator supplies the URL (Uniform Resource Locator) of the WSDL file of the web service to a Publishing module at the Web Service Proxy Server. The invention should not be considered limited to the administrator supplying the URL to register a web service. A web service can be registered through alternate methods such as using UDDI. The Publishing module then parses the WSDL file and identifies a list of target desktop applications for the web service. Also, the Publishing module identifies the operations provided by the web service. The Publishing module then identifies operations that are not compatible with the desktop applications. All the operations that are not compatible with the desktop applications are removed from the published list of operations. Also, at the time of publishing a web service, the administrator may append additional information to the WSDL file. For example, the administrator can append additional formatting details on objects returned by the web service operations, access rights for users/group of users for each operation and communication standard and security policies used for interacting with the web services.

When a user logs in the system to access the registered web services, a request is sent to the system to make contact with a Directory server module at the Web Service Proxy Server. On obtaining such a request, the system first checks the authenticity of the user. A Credential gatherer module within the Plug-in gathers the credentials of the user. The gathered credentials are forwarded to an Authentication module within the Web Service Proxy Server. The Authentication module checks the authenticity of the user, i.e., validates and proves if the user is actually who the user claims to be. After the user is authenticated, an Authorization module within the Web Service Proxy Server identifies the web services and operations the user is authorized to access. The Directory server module within the Web Service Proxy Server gathers the WSDL files of all the web services identified and forwards them to a Directory client module. The Directory client module forwards these WSDL files to a Service virtualization module within the Plug-in. The Service virtualization module prompts the user to select a collection of web services and operations that the user intends to access in the current session.

Once the user chooses the web services and the operations, a Template generator module within the Plug-in, generates template documents required for presenting the output data of the operations. The Template generator module generates the templates by obtaining formatting information from the WSDL files of the web services. The formatting information obtained from the WSDL files also includes the formatting details specified by the administrator at the time of publishing the web services. The Web Service Proxy Server also contains a Credential exchange server module, which translates one form of authentication assertion to another. The Credential exchange server module is activated when the authentication assertion required by the web services is different from the authentication mechanism used by the Web Service Proxy Server. The user then accesses the web services and operations. The communication with each web service is performed conforming to the standards and security policies specified in the WSDL file. These communication standards and security policies also include the information provided by the administrator at the time of publishing the web services. The output data obtained by the web services is then presented to the user using the templates generated by the Plug-in.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED
EMBODIMENTS

This disclosed invention enables an administrator/user to access web services using desktop applications. A system in accordance with the disclosed invention extends the capabilities of desktop applications to discover, connect and converse with web services without any programming effort by the user.

Figure 1:
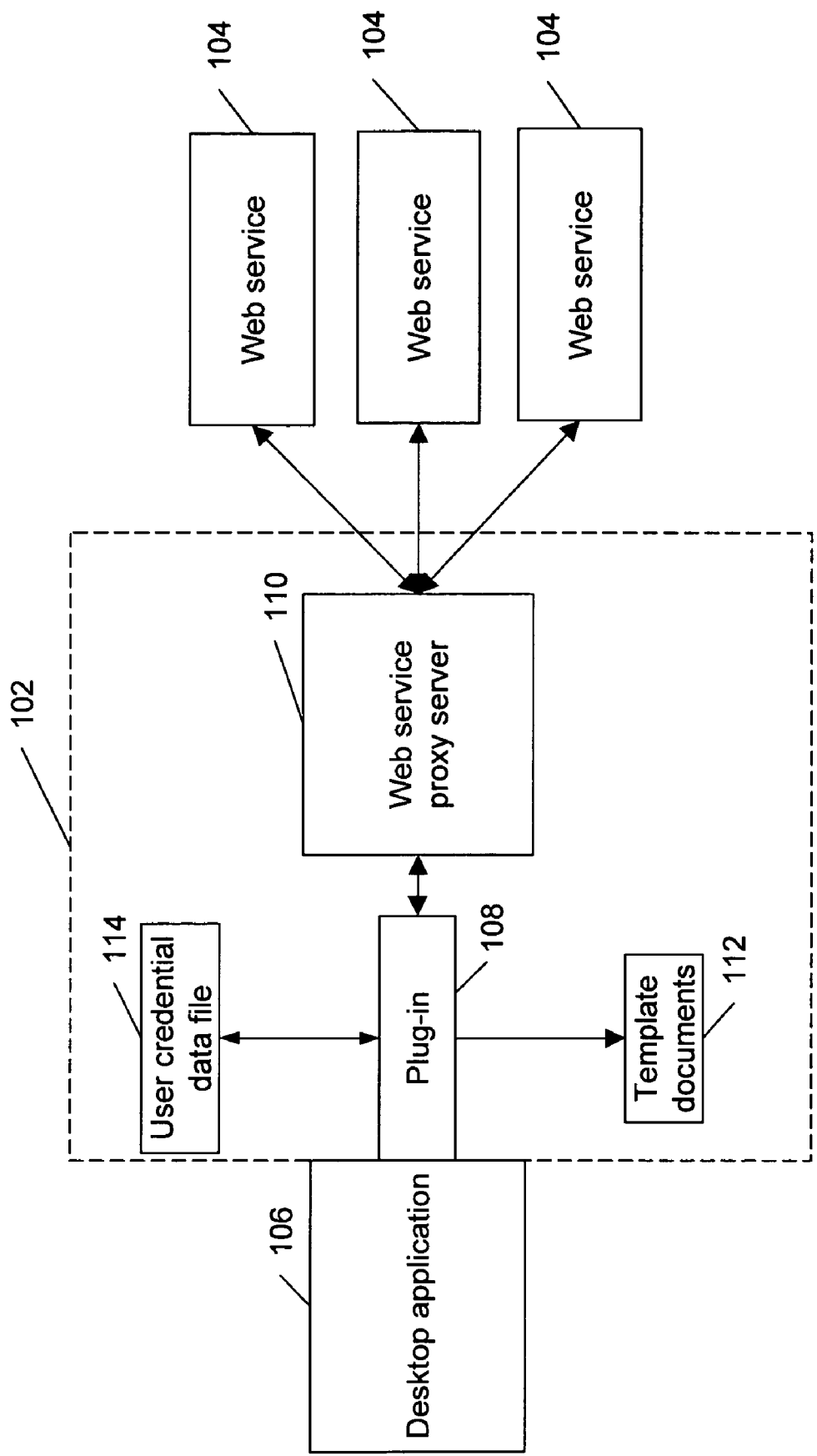
FIG. 1 is a block diagram of the environment in which the disclosed invention operates in accordance with an embodiment of the disclosed invention.

FIG. 1 is a block diagram of an environment in which the disclosed invention operates, in accordance with an embodiment of the disclosed invention. A System 102 in accordance with the present invention allows a plurality of Web services 104 to be accessed using a Desktop application 106. System 102 comprises a Web Service Proxy Server (WSPS) 110 and a Plug-in 108 that corresponds to Desktop application 106. Plug-in 108 is installed on Desktop application 106 to handle the transactions between Desktop application 106 and WSPS 110. Plug-in 108 provides the transaction output to Desktop application 106 in accordance with the instructions provided in the WSDL file of Web service 104. In an embodiment, the transaction output is presented through a plurality of Template documents 112 obtained from Web service 104 generated by Plug-in 108. Also, Plug-in 108 makes use of a plurality of user credentials for authenticating a user. These user credentials are obtained from a User credential data file 114 maintained by Plug-in 108. WSPS 110 sits between Desktop application 106 and Web services 104. The transaction between Desktop application 106 and Web services 104 is handled by WSPS 110.

Figure 2:
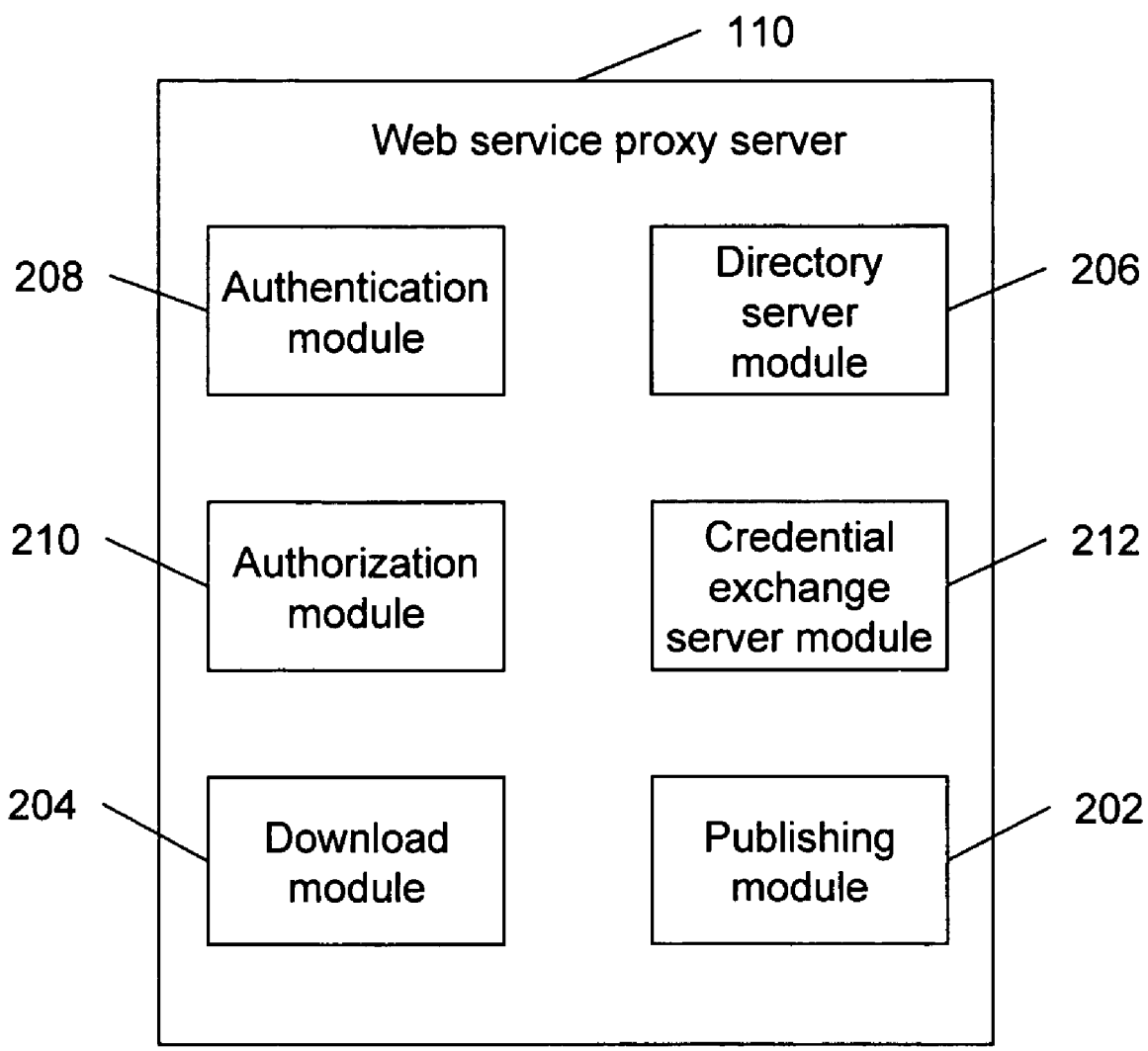
FIG. 2 is a block diagram of a Web Service Proxy Server.

FIG. 2 is a block diagram of Web Service Proxy Server 110. WSPS 110 provides support services to Plug-in 108 to access Web services 104. The services provided by WSPS 110 are facilitated by means of various modules that are present in WSPS 110. WSPS 110 comprises various modules such as: a Publishing module 202, a Download module 204, a Directory server module 206, an Authentication module 208, an Authorization module 210 and a Credential exchange server module 212.

Publishing module 202 enables an administrator to register and publish a plurality of Web services 104. The administrator provides the Uniform Resource Locator (URL) of the WSDL file of Web service 104 to Publishing module 202. Using the WSDL file, Publishing module 202 gains information about the operations corresponding to Web service 104. For example, consider a web service that provides interface to a SAP system. This web service has three operations described in the WSDL file:

a) int CountOpenOrders ( ), returns the number of open orders in the SAP system
b) string[ ] GetOrderIDs( ), returns the number of open orders in the SAP system
c) Order GetOrder(string OrderID), based on the OrderID, returns an Order object—a complex data structure Publishing module 202 is also used for appending additional information to the WSDL file of Web service 104. This information may relate to formatting information and/or communication standard/mechanisms. This information is appended to a copy of the WSDL file of Web service 104 and this copy is stored with WSPS 110. Further dependence of Publishing module 202 on other modules will be discussed with reference to FIG. 4.

Download module 204 is responsible for hosting downloads of Desktop application Plug-ins. This module maintains Plug-in installations for various desktop applications that are supported by Web services 104.

Directory server module 206 provides listings of description and discovery information on registered Web services 104. The description and discovery information is obtained from the WSDL files.

Authentication module 208 validates the authenticity of the user. In other words, Authentication module 208 proves and validates the user is who he/she claims to be. This module returns an assertion to the user-requesting authentication. In accordance with another embodiment of the present invention, Authentication module 208 can be provided by a third party authorization service.

Based on the validation information received from Authentication module 208, Authorization module 210 identifies the Web services 104 and operations that are accessible to a particular user. This module also decides, what operations are available to that user. The administrator specifies the access rights of various operations/web services at the time of publishing. These access rights can be provided to individual users or groups of users.

Credential exchange server module 212 translates one form of authentication assertion to another. This module is activated when a web service requires an authentication assertion different from the authentication assertion provided by WSPS 110. Credential exchange server module 212 has been further explained with reference to FIG. 4.

Figure 3:
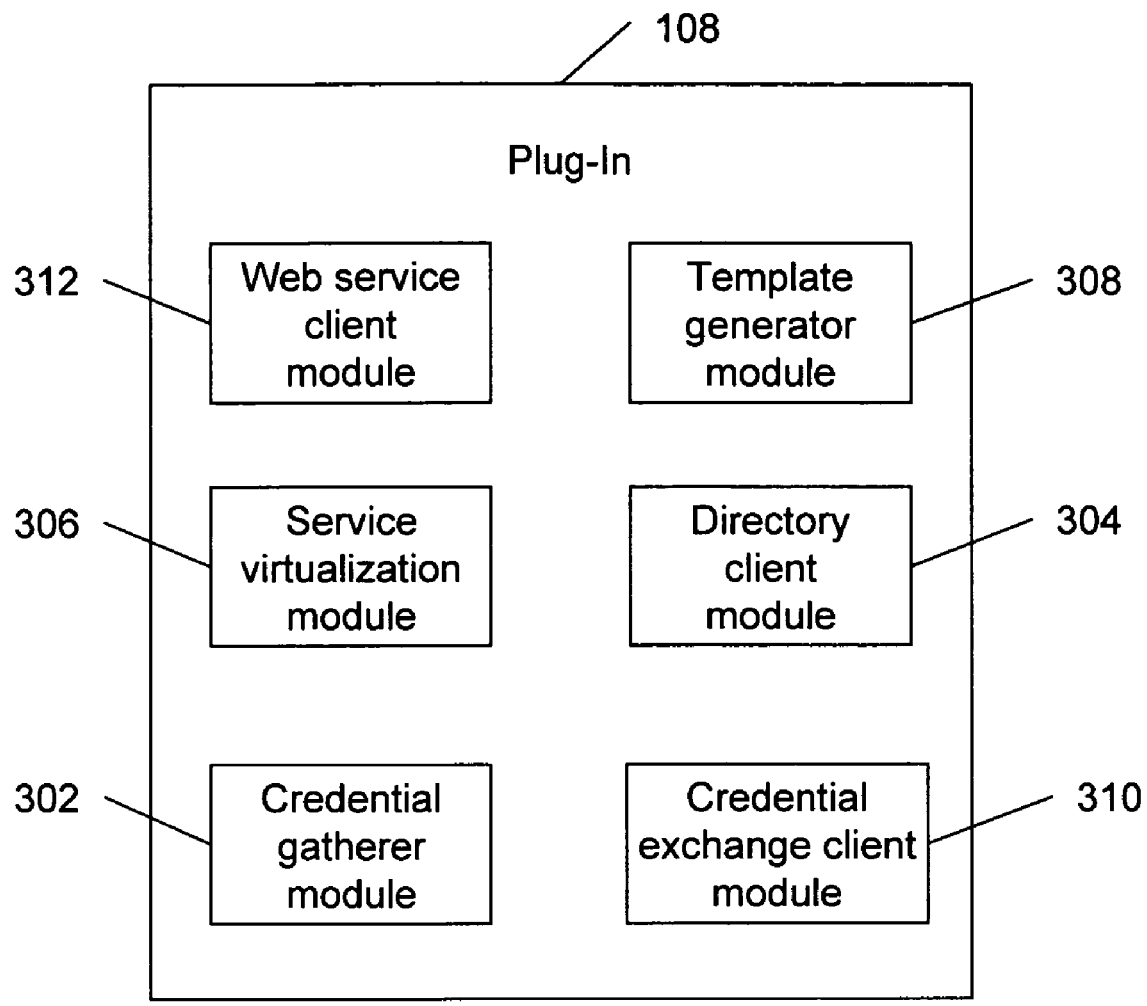
FIG. 3 is a block diagram of a Plug-in for a desktop application.

FIG. 3 is a block diagram of Plug-in 108. Plug-in 108 acts as an interface between Desktop application 106 and WSPS 110. Plug-in 108 comprises the following modules: a Credential gatherer module 302, a Directory client module 304, a Service visualization module 306, a Template generator module 308, a Credential exchange client module 310 and a Web service client module 312.

Credential gatherer module 302 gathers current user's authentication credentials. The credentials are supplied by the user or are stored with System 102.

Directory client module 304 is responsible for communicating with Directory server module 206 of WSPS 110. The credential information gathered by Credential gatherer module 302 is forwarded to Directory client module 304. Directory client module 304 supplies this credential information to WSPS 110 and retrieves the list of web services and operations that a particular user has access to.

Service virtualization module 306 obtains the list of web services/operations that a particular user has access to from Directory client module 304. And, Service virtualization module 306 presents this list to the user in the form of an interface. This interface allows the user to pick the web services and operations that he wishes to use.

Template generator module 308 is responsible for generating a plurality of template documents corresponding to each of the web service selected by the user. Template generator module 308 reads the formatting details from the WSDL file. These details include the formatting information entered by the administrator at the time of publishing. Template generator module 308 parses the WSDL file and understands the formatting requirements. This module uses these details to generate Template documents 112.

The functionality of Template generator module 308 is herein after illustrated with the help of an example of a Template generator module 308 for a spreadsheet application like MS Excel. Template generator module 308 for the spreadsheet application parses the WSDL file. On the basis of the formatting details, Template generator module 308 formats a block of cells on the active sheet. Formatting a block of cells may include setting the column width, drawing borders, setting the cell type and other similar formatting features permitted by the spreadsheet application. The module utilizes the published modules (such as APIs for MS Excel) of the hosting application to create one or a set of documents for that application.

The functionality of Template generator module 308 can further be illustrated with the help of an example of Template generator module 308 for a word processing application. Template generator module 308 for a word-processing application parses the WSDL file. On the basis of the formatting details, Template generator module 308 formats the document. Formatting a document may include inserting a table, setting the font size/color and other similar formatting features permitted by the word processing application.

The example of Spreadsheet applications and word-processing described above serves only to illustrate the functioning of Template generator module 308. The present invention should not be considered limiting to these two desktop applications only. It will be apparent to one skilled in the art that Template generator module 308 can be used with various other desktop applications.

Credential exchange client module 310 facilitates translation of one form of authentication assertion to another. This module handles situations when the user is already authenticated against a particular authentication mechanism at WSPS 110. Yet the WSDL file indicates that a particular operation requires assertion by a different authentication mechanism at Web service 104. Credential exchange client module 310 retrieves the user credentials from User credential data file 114. It forwards this credential to Credential exchange server module 212 and requests for an equivalent assertion by the different authentication mechanism. The functionality of Credential exchange client module 310 is further illustrated with the help of the following example. Consider a case where a user logs into his operating system that uses Kerberos authentication mechanism and a web service understands only SAML credentials. In this case, Credential exchange client module 310 connects to Credential exchange server module 212 on WSPS 110. Credential exchange client module 310 supplies the user's Kerberos credential, and requests for an equivalent assertion in SAML. The assertion in SAML received from Credential exchange server module 212 is saved in User credential data file 114. The credentials of the users are not shared among different users to avoid unauthorized access to the services.

Web service client module 312 understands the WSDL file of a web service to carry out various actions. Examples of these actions include identifying the type of credential exchange, the type of transport protocol to be used for a particular operation and signature verification on returned data. The functions of Web service client module 312 have been further described with reference to FIG. 4.

Figure 4:
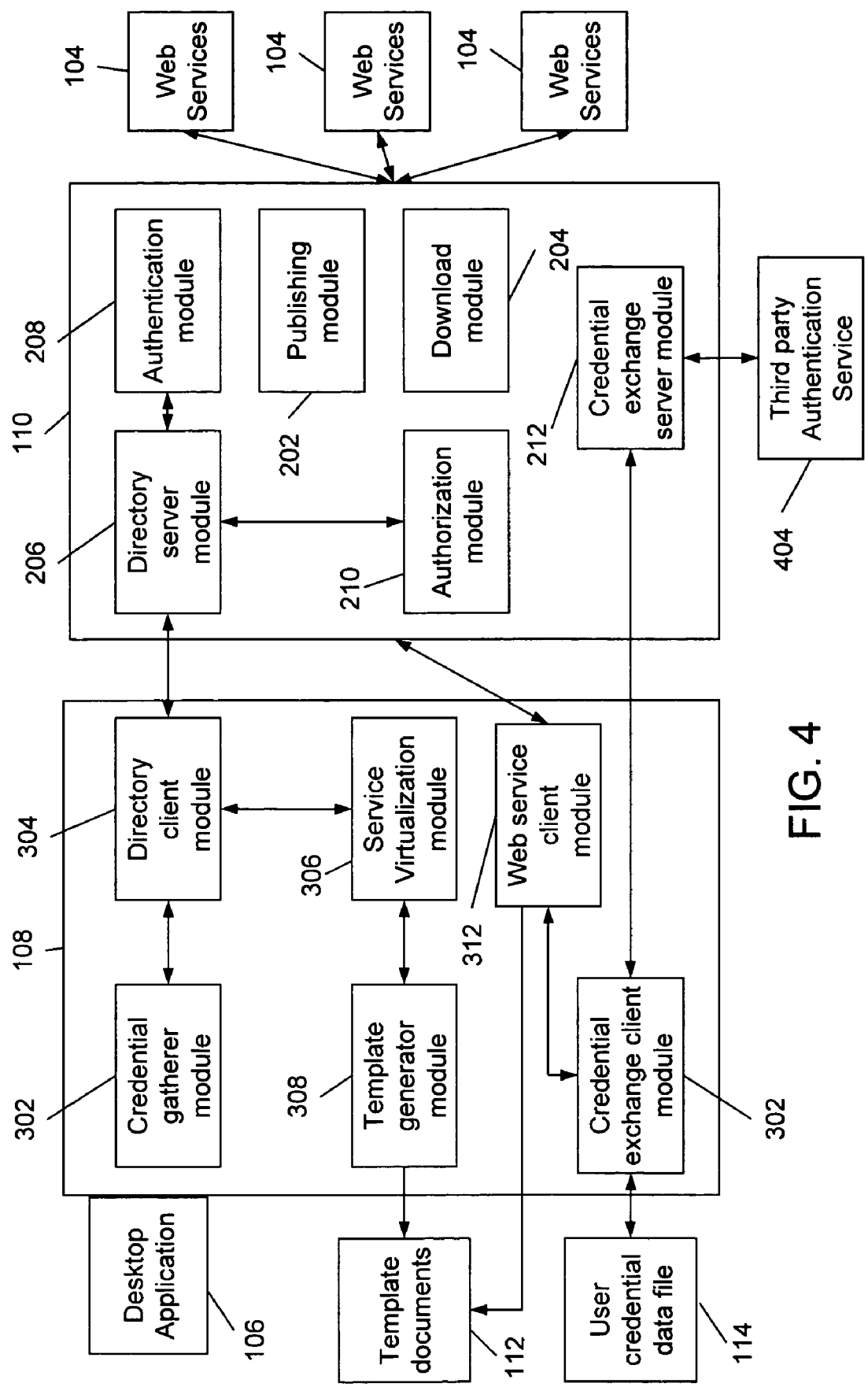
FIG. 4 is a block diagram showing the interaction between the various modules of a Plug-in, Web Service Proxy Server and multiple Web services.

FIG. 4 is a block diagram showing the interaction between the various modules of Plug-in 108, various modules of WSPS 110 and Web services 104. The interrelationships depicted in this diagram are explained with reference to the method of extending the capabilities of desktop applications to access Web services 104. The user connects to WSPS 110 by using the URL of WSPS 110. The user then downloads a Plug-in installer for Desktop application 106 that he/she wishes to use for accessing Web services 104. The Plug-in installers for various desktop applications are maintained by Download module 204. The user installs Plug-in 108 for Desktop application 106. Credential gatherer module 302 gathers the authentication credentials from the user and forwards them to Directory client module 304. By way of an example, Credential gatherer 302 locates the Kerberos certificate of the user and hands it to Directory client module 304. Directory client module 304 forwards the credentials of the user to Directory server module 206 and requests it for a list of web services and operations that the user has access to. At WSPS 110, Directory server module 206 validates the credential information using Authentication module 208. After the user is authenticated, Authorization module 210 determines what resources will be accessible by the current user. Hereafter, Directory server module 206 provides the WSDL files for each of the available web services to Directory client module 304. The WSDL files received by Directory client module 304 are forwarded to Service virtualization module 306. Service virtualization module 306 prompts the user to select the web services and operations the user wants to access. The input provided to Service virtualization module 306 is forwarded to Template generator module 308. Template generator module 308 uses the information appended to the WSDL file to generate a plurality of Template documents 112 for Desktop application 106. Template documents 112 are pre-formatted according to the formatting information provided at the time of publishing. Template documents 112 also has associated scripts/programs to enable access to Web services 104. Using Template documents 112, the user can access Web services 104. Template documents 112 interact with Web service client module 312 while accessing Web services 104. Based on the WSDL file provided by WSPS 110, Web service client module 312 immediately understands if there is any specific communication standards/mechanisms mentioned for a particular operation. By way of an example, the transport protocol for a particular operation might be set as HTTPS instead of the usual HTTP. In such a case, at the time of using this particular operation, Web service client module 312 ensures that the transport protocol used for this operation is HTTPS instead of HTTP.

Web service client module 312 also handles cases where the authentication mechanism required by a web service is different from the mechanism used by Authentication module 208. By way of an example, the user is authenticated against a Kerberos server and an operation requires SAML assertion. In such a case, Credential exchange client module 302 takes the Kerberos credential and forwards it to the Credential exchange server module 212. Credential exchange server module 212 has a record of various third party authentication services. Therefore, Credential exchange server module 212 looks-up the records and supplies the credentials compatible with SAML to the third party SAML authentication service. A Third party authentication service 404 validates the supplied credentials and returns an assertion to the request to Credential exchange server module 212. Credential exchange server module 212 then forwards this new assertion back to User credential data file 114. The data returned as an output for the various operations are automatically filled in Template documents 112 and presented to the user. Any script/program associated with any of the fields in Template documents 112 is automatically executed while filling up the fields, hence attending to the predefined formatting details.

Figure 5:
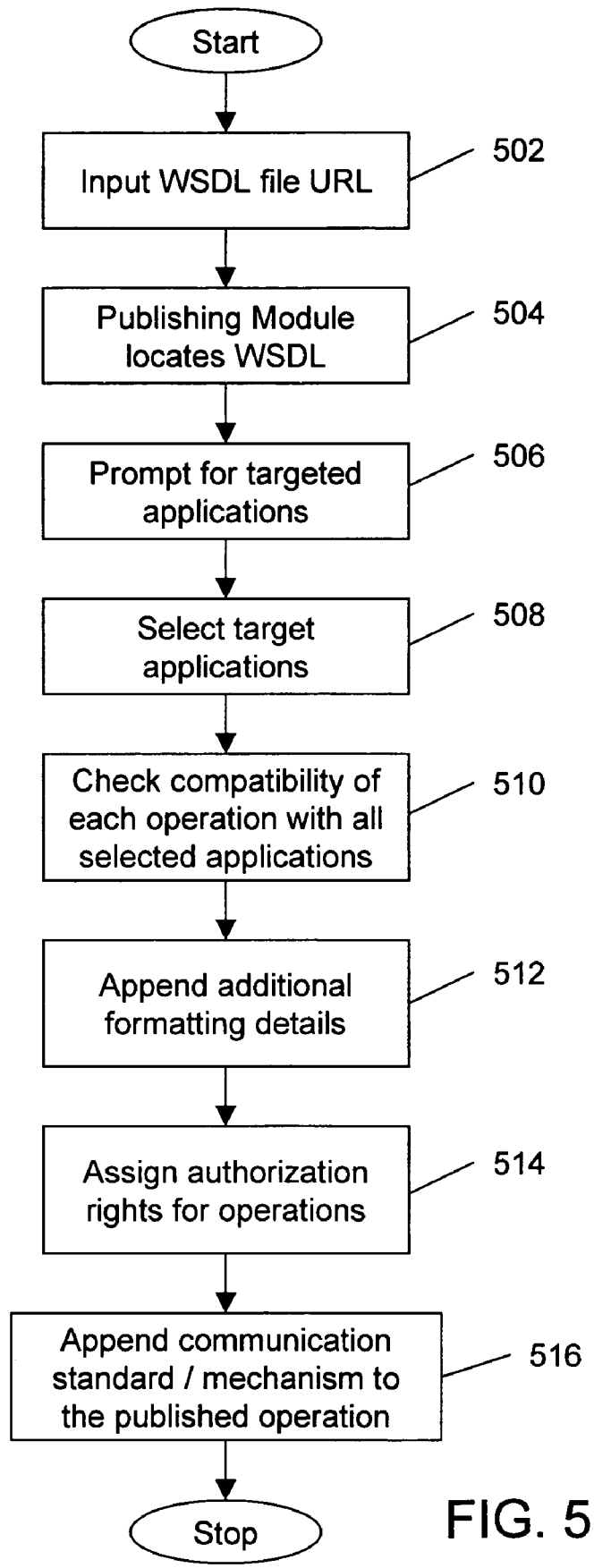
FIG. 5 is a flowchart describing the steps involved in the publishing of a Web service with the Web Service Proxy Server in accordance with a preferred embodiment of the present invention.

FIG. 5 is a flowchart depicting the steps involved in the publishing of a web service with WSPS 110 in accordance with a preferred embodiment of the present invention. At step 502, the administrator inputs the URL of the WSDL file corresponding to the web service that is to be registered. This URL is supplied to Publishing module 202. At step 504, Publishing module 202 locates the WSDL file and extracts the description of the operations that can be performed by this web service. The administrator is prompted a list of desktop applications this web service is targeted for, at step 506. The administrator selects the target applications from the prompted list at step 508. Once the desktop applications for which the web services are registered are selected, each operation is checked for compatibility with these applications, at step 510. The information regarding the desktop applications compatible with the operations is stored at the web service. Hence, at the time of publication, the web services check the compatibility of each desktop application with the operations. At step 512, for each targeted application, Publishing module 202 prompts the administrator for formatting details about each of the output message parts. The formatting details provided by the administrator are appended to the WSDL file at Web Service Proxy Server 110. The formatting details are communicated to the WSDL file as comments. For example, Table 1 depicts a WSDL file maintained at Web Service Proxy Server 110. One of the operations mentioned in this WSDL file is 'placeOrder'. In this example, the return object of operation 'placeOrder' may have certain formatting details associated with it. In this case, the return object has the following formatting details associated with it: a title labeled 'OrderID', maximum length of the title. 'OrderID' is 32 characters and a hyperlink is associated with each value. An exemplary set of formatting instructions corresponding to the formatting details for the return object of operation 'placeOrder' is depicted in Table 2. Further, the formatting instructions may be inserted in the WSDL file. An exemplary embodiment depicting the WSDL file containing the formatting instructions has been provided in Table 3. At step 514, the administrator can assign authorization rights for various operations. And finally at step 516, the administrator can enforce communication standards/mechanisms. Further details of steps 510, 512, 514 and 516 are provided with FIG. 5, FIG. 6, FIG. 7 and FIG. 8 respectively.

FIG. 5 shows a particular order of performing steps 510-516. However, the present invention should not be considered limited to this order only. In fact, steps 510-516 can be performed in any order and FIG. 5 presents one such order of execution these steps.

Figure 6:
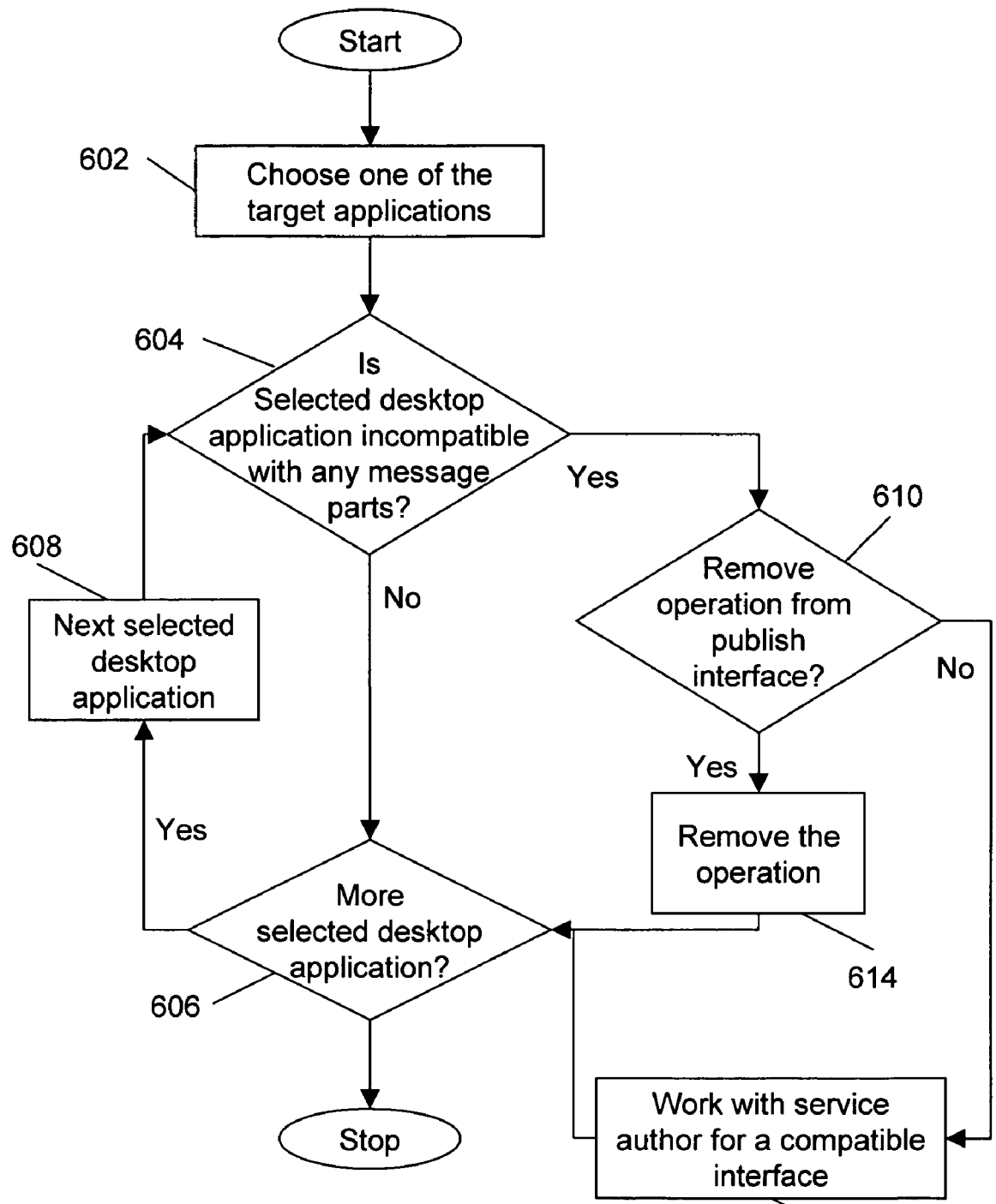
FIG. 6 is a flow chart depicting various steps involved in checking the compatibility of each operation of a Web service with all selected desktop applications.

FIG. 6 is a flow chart depicting various steps involved in checking compatibility of each operation of a web service with all selected desktop applications at step 510. After the administrator selects a set of applications that are to be targeted at step 508, step 602 is performed. At step 602 one of the selected desktop applications is chosen. At step 604, Publishing module 202 checks if any of the output messages available for the web services are incompatible with the application selected in step 602. If no incompatibility is encountered at step 604 then, at step 606, a check is made if there are any more selected applications. If there are any more selected applications left at step 606 then step 608 is performed. At step 608, another selected desktop application is chosen. Step 604 follows step 608. At step 604, if any incompatibility is encountered then step 610 is performed. At step 610, a check with the administrator is made if the administrator wants to remove the operation that corresponds to the incompatible output message. If the administrator wishes to keep this operation from the publish interface then the administrator works with the author of the web service to make the web service compatible. At step 614, the administrator removes the operation from the publish interface and then moves on to step 606. For example, consider the example web service that provides interface to a SAP system. As already discussed, the web service has three operations described in the WSDL file:

1. int CountOpenOrders ( ), returns the number of open orders in the SAP system
2. string[ ] GetOrderIDs( ), returns the number of open orders in the SAP system
3. Order GetOrder(string OrderID), based on the OrderID, returns an Order object a complex data structure System 102 locates the WSDL file of the web service and gains knowledge of the three operations and the list of desktop applications this web service is targeted for. The administrator chooses a desktop application, say MS Excel, at step 602. At step 604, Publishing module 202 checks the compatibility of MS Excel with the three operations. Looking at the complex data structure returned by the third operation, Order GetOrder(string OrderID), Publishing module 202 identifies that handling the returned object is beyond MS Excel's capability. Publishing module 202 raises an error for the administrator. At step 612, the administrator determines whether to remove the operation from the publish list of operations. Depending on the choice made by the administrator at step 610, the administrator may remove the operation (step 614) or work with the web service author for providing an interface compatible with MS Excel (step 612).

Figure 7:
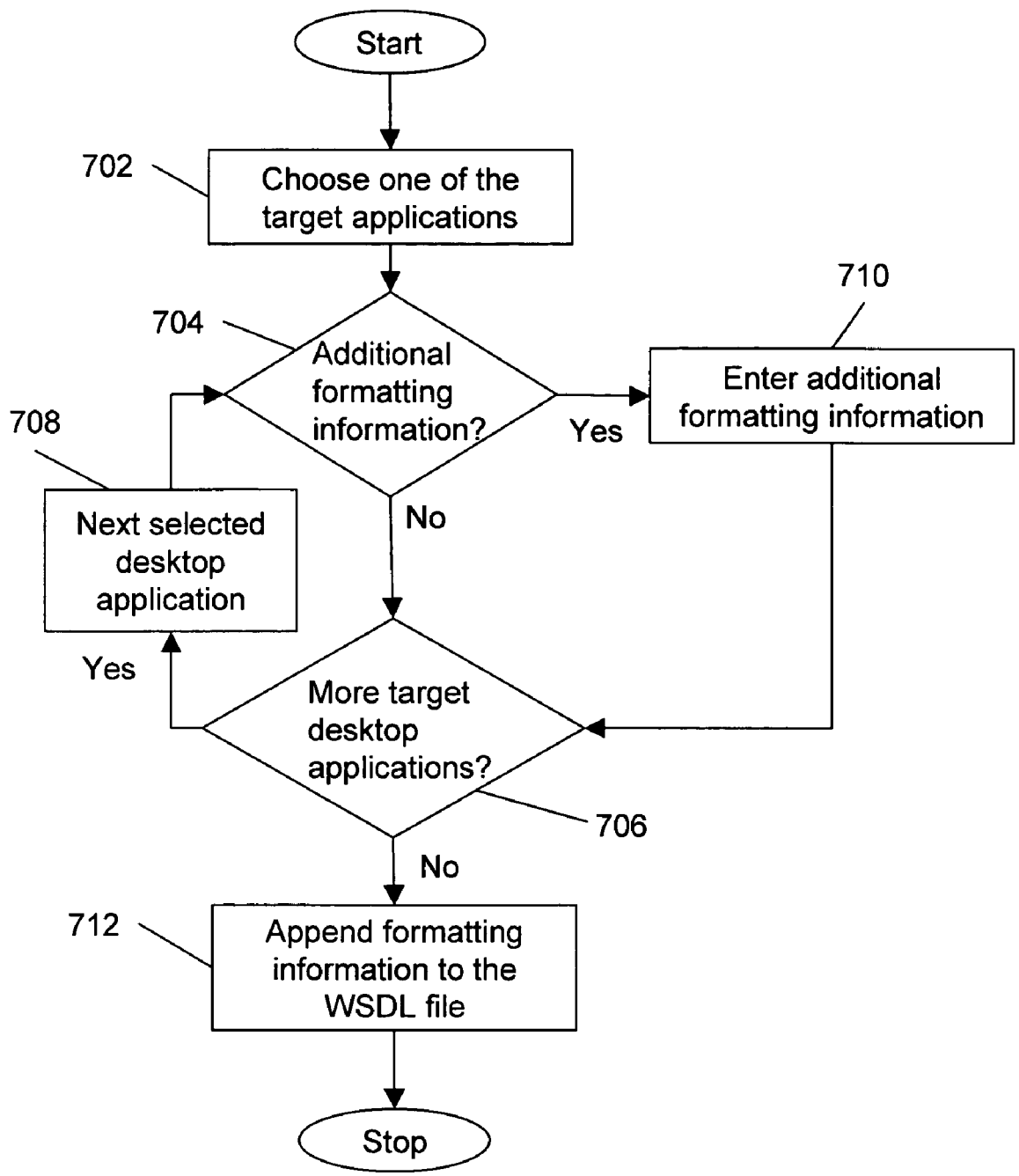
FIG. 7 is a flowchart depicting various steps involved in appending formatting details corresponding to each operation of a Web service for all selected desktop applications.

FIG. 7 is a flowchart depicting various steps involved in appending formatting details corresponding to each operation of a web service for all selected desktop applications at step 512 in FIG. 5. At step 702 one of the selected applications is chosen. At step 704, Publishing module 202 checks if any additional formatting information is to be provided corresponding to any of the operation's output messages for the selected application. If no additional formatting information is to be provided at step 704 then step 706 is chosen. At step 706, a check is made if there are any more selected desktop applications. If there are any more selected applications left at step 706 then step 708 is performed. At step 708, the next Desktop application is selected. After choosing the next Desktop application at step 708, step 704 is performed. At step 704, if additional formatting information is to be provided then step 710 is performed. At step 710, the administrator provides additional formatting information corresponding to any of the operation's output messages for the selected desktop application. After providing the additional formatting information, step 706 is performed. At step 706, if there are no more selected applications remaining then step 712 follows. At step 712, the formatting information is appended to a local WSDL file.

Referring back to the example web service, the second operation, string[ ] GetOrderIDs( ), returns an array of strings. A desktop application, say MS Excel, can interpret it as a set of a single column rows of text. To generate a more sophisticated template, the administrator provides additional formatting details using steps depicted in flowchart of FIG. 7. At step 702, the administrator chooses one of the target applications, say MS Excel. At step 704, the administrator decides if additional formatting information needs to be specified. In case the administrator decides to provide additional formatting details, he/she specifies these details at step 710 and appends these details to the WSDL file of the web service at step 712. For example, the administrator specifies following formatting details for the second operation, string[ ] GetOrderIDs( ), the returned object:

1. has a title labeled "OrderID"
2. maximum width is expected to be 32 characters long
3. should have a hyperlink associated with each value, with the base URL being htt://xyz.com/simplifiedSAP?ordered=[X]

This formatting information is appended to the WSDL file at step 712. The administrator performs the steps 702-712 for each target desktop application.

Figure 8:
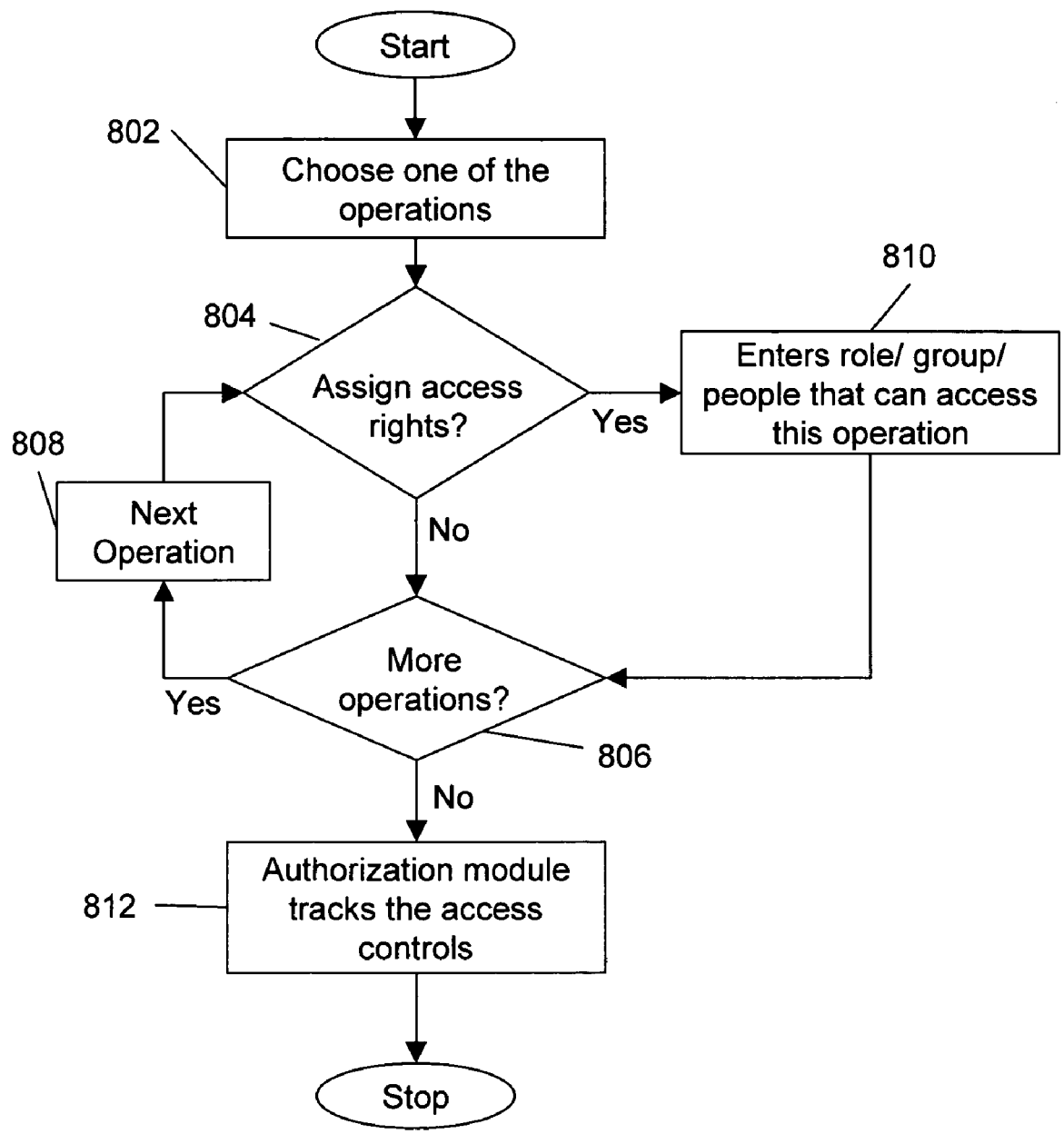
FIG. 8 is a flowchart depicting various steps involved in assigning authorization rights corresponding to each operation of a Web service for all selected desktop applications.

FIG. 8 is a flowchart depicting various steps involved in assigning access rights corresponding to each operation of a web service for all selected applications at step 514 of FIG. 5. At step 802, one of the available operations for the web service is chosen. At step 804, Publishing module 202 checks if any authorization rights are to be attached to the chosen operation. If no authorization rights are to be attached at step 804 then step 806 follows. At step 806, a check is made if there are any more available operations for the web service. If there are any more available operations left at step 806, then step 808 is performed. At step 808, a next operation is chosen. After choosing the next operation at step 808, step 804 is performed. At step 804, a check is made if access rights are to be attached. In case access rights are to be attached, step 810 is performed. At step 810, the administrator enters the role/group/people that can access this operation for the selected desktop application. After providing the access rights, step 806 is performed. At step 806, a check is made if there are more available operations remaining. In case there are more operations, step 812 is performed. At step 812, the access rights set by the administrator are communicated to Authorization module 210. And, Authorization module 210 keeps track of the access control, allowing the user to view only the operations/web services that the user has access to.

Figure 9:
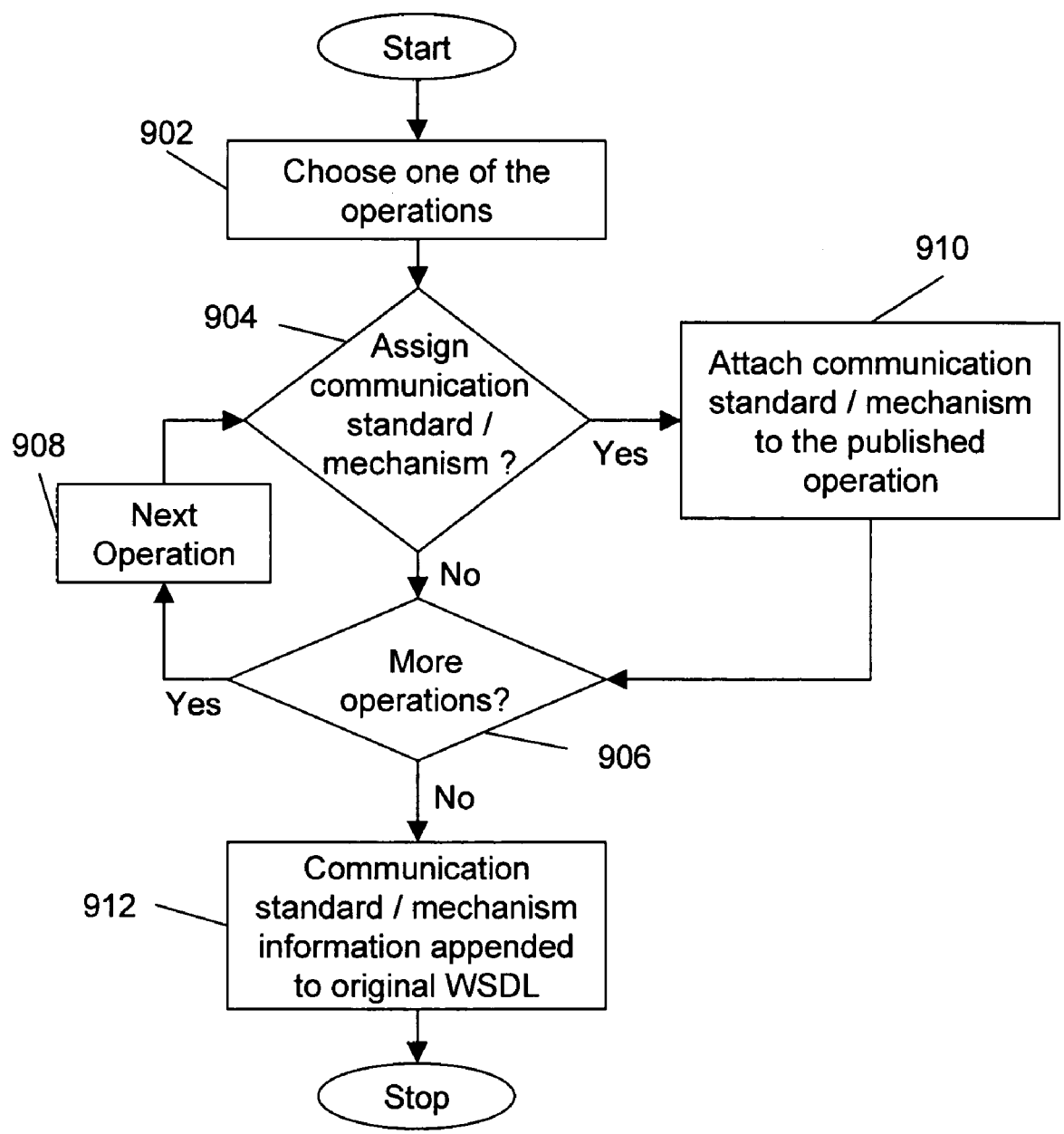
FIG. 9 is a flowchart depicting various steps involved in assigning specific communication standards/mechanisms corresponding to each operation of a Web service for all selected desktop applications.

FIG. 9 is a flowchart depicting various steps involved in assigning specific communication standards/mechanisms corresponding to each operation of a web service for all selected desktop applications at step 516 of FIG. 5. At step 902, one of the available operations for the web service is chosen. At step 904, Publishing module 202 checks if any specific communication standards/mechanisms are to be attached to the chosen operation. If no specific communication standards/mechanisms are to be attached at step 904 then step 906 is performed. At step 906, a check is made if there are any more available operations for the web service. If there are any more available operations left at step 906 then step 908 is performed. At step 908 the next operation is chosen. Thereafter, step 904 is performed. At step 904, a check is made if any specific communication standards/mechanisms are to be attached. In case communication standards/mechanisms are to be attached then step 910 is performed. At step 910, the administrator enters the specific communication standards/mechanisms to be used for this operation. After providing the specific communication standards/mechanisms to be used for this operation, step 906 is performed. At step 906, if there are no more available operations remaining then step 912 is performed. At step 912, the specific communication standards/mechanisms set by the administrator are appended to the WSDL file.

For example, referring back to the example web service, the administrator may specify following communication standards/mechanisms at step 910:

1. digitally sign the returned object in the second operation, string[ ] GetOrderIDs( ), and
2. requires the input parameter, OrderID, in the third operation, Order GetOrder(string OrderID), to be encrypted.

This information is appended to the WSDL file at step 912. While accessing the web service, Plug-in 108 knows by reading the WSDL file:

1. to verify the signature on the returned object for the second operation, string[ ] GetOrderIDs( ), and
2. to encrypt OrderID in the third operation, Order GetOrder(string OrderID), before sending the message to the web service.

The various modules of the present invention can be developed using a high level programming language. For example, the modules present in WSPS 110 may be implemented in any programming language such as C, C++, Java®, C#®, or any other programming language that is supported by the server. The modules present in Plug-in 108 may be implemented in any programming language such as C, C++, Java®, C#®, or any other programming language that allows integration with Desktop application 106. The various modules can be implemented using a number of standard tools and/or libraries. For example, the modules of Plug-In 108 can be developed using .NET framework 1.1 and WSPS 110 can be developed using JDK1.4 and various open source libraries.

An advantage of the present invention is that the capabilities of desktop applications in discovering, connecting and conversing with web services are extended.

Another advantage of the present invention is that no programming is required on the users part to extend the capabilities of the desktop applications.

Another advantage of the present invention is that pre-formatted template documents are generated for presenting the output data obtained from web services. Also, the present invention enables an administrator to specify the format of the template documents as per the administrator's requirements.

Yet another advantage of the present invention is that it enables communication mechanisms between desktop applications and web services that are not originally supported by the desktop applications.

Still another object of the present invention is that it insures compatibility of a desktop application with web services given the limits of the desktop applications.

The system, as described in the disclosed method, or any of its components may be embodied in the form of a processing machine. Typical examples of a processing machine include a general-purpose computer, a programmed microprocessor, a micro-controller, a peripheral integrated circuit element, and other devices or arrangements of devices, which are capable of implementing the steps that constitute the disclosed method.

The processing machine executes a set of instructions that are stored in one or more storage elements, in order to process input data. The storage elements may also hold data or other information as desired. The storage element may be in the form of a database or a physical memory element present in the processing machine.

The set of instructions may include various instructions that instruct the processing machine to perform specific tasks such as the steps that constitute the disclosed method. The set of instructions may be in the form of a program or software. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to a user commands, or in response to the results of previous processing or in response to a request made by another processing machine.

A person skilled in the art can appreciate that it is not necessary that the various processing machines and/or storage elements be physically located in the same geographical location. The processing machines and/or storage elements may be located in geographically distinct locations and connected to each other to enable communication. Various communication technologies may be used to enable communication between the processing machines and/or storage elements. Such technologies include connection of the processing machines and/or storage elements, in the form of a network. The network can be an intranet, an extranet, the Internet or any client server models that enable communication. Such communication technologies may use various protocols such as TCP/IP, UDP, ATM or OSI.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

TABLE 1

```
<wsdl:definitions targetNamespace="http://localhost:8080/axis/corp-demo/OrderInfo.jws"
    xmlns="http://schemas.xmlsoap.org/wsdl/" xmlns:apachesoap="http://xml.apache.org/xml-soap"
    xmlns:impl="http://localhost:8080/axis/corp-demo/OrderInfo.jws"
    xmlns:intf="http://localhost:8080/axis/corp-demo/OrderInfo.jws"
    xmlns:soapenc="http://schemas.xmlsoap.org/soap/encoding/"
    xmlns:wsdl="http://schemas.xmlsoap.org/wsdl/"
    xmlns:wsdlsoap="http://schemas.xmlsoap.org/wsdl/soap/"
    xmlns:xsd="http://www.w3.org/2001/XMLSchema">
    <wsdl:message name="placeOrderRequest">
        <wsdl:part name="symbol" type="xsd:string" />
    </wsdl:message>
    <wsdl:message name="placeOrderResponse">
        <wsdl:part name="placeOrderReturn" type="xsd:string" />
    </wsdl:message>
    <wsdl:portType name="OrderInfo">
    <wsdl:operation name="placeOrder" parameterOrder="date">
        <wsdl:input message="impl:placeOrderRequest" name="placeOrderRequest" />
        <wsdl:output message="impl:placeOrderResponse" name="placeOrderResponse" />
    </wsdl:operation>
    </wsdl:portType>
    <wsdl:binding name="OrderInfoSoapBinding" type="impl:OrderInfo">
        <wsdlsoap:binding style="rpc" transport="http://schemas.xmlsoap.org/soap/http" />
        <wsdl:operation name="placeOrder">
            <wsdlsoap:operation soapAction="" />
            <wsdl:input name="placeOrderRequest">
                <wsdlsoap:body
                    encodingStyle="http://schemas.xmlsoap.org/soap/encoding/"
                    namespace="http://DefaultNamespace" use="encoded" />
            </wsdl:input>
            <wsdl:output name="placeOrderResponse">
                <wsdlsoap:body
                    encodingStyle="http://schemas.xmlsoap.org/soap/encoding/"
                    namespace="http://localhost:8080/axis/corp-demo/OrderInfo.jws"
                    use="encoded" />
            </wsdl:output>
        </wsdl:operation>
    </wsdl:binding>
    <wsdl:service name="OrderInfoService">
        <wsdl:port binding="impl:OrderInfoSoapBinding" name="OrderInfo">
            <wsdlsoap:address location="http://localhost:8080/axis/corp-demo/OrderInfo.jws" />
        </wsdl:port>
    </wsdl:service>
</wsdl:definitions>
```

TABLE 2

```
<!-- formatting instruction:
[
    Label="OrderID";
    MaxLength=32;
    Hyperlink="http://xyz.com/simplifiedSAP?orderID=${value}"
]
//-->
```

TABLE 3

```
<wsdl:definitions targetNamespace="http://localhost:8080/axis/corp-demo/OrderInfo.jws"
xmlns="http://schemas.xmlsoap.org/wsdl/" xmlns:apachesoap="http://xml.apache.org/xml-soap"
xmlns:impl="http://localhost:8080/axis/corp-demo/OrderInfo.jws"
xmlns:intf="http://localhost:8080/axis/corp-demo/OrderInfo.jws"
xmlns:soapenc="http://schemas.xmlsoap.org/soap/encoding/"
xmlns:wsdl="http://schemas.xmlsoap.org/wsdl/"
xmlns:wsdlsoap="http://schemas.xmlsoap.org/wsdl/soap/"
xmlns:xsd="http://www.w3.org/2001/XMLSchema">
  <wsdl:message name="placeOrderRequest">
    <wsdl:part name="symbol" type="xsd:string" />
  </wsdl:message>
    <wsdl:message name="placeOrderResponse">
      <wsdl:part name="placeOrderReturn" type="xsd:string">
        <!-- formatting instruction:
        [
          Label="OrderID";
          MaxLength=32;
          Hyperlink="http://xyz.com/simplifiedSAP?orderID=${value}"
        ]
        //-->
  </wsdl:part>
</wsdl:message>
<wsdl:portType name="OrderInfo">
  <wsdl:operation name="placeOrder" parameterOrder="date">
    <wsdl:input message="impl:placeOrderRequest" name="placeOrderRequest" />
      <wsdl:output message="impl:placeOrderResponse" name="placeOrderResponse" />
    </wsdl:operation>
</wsdl:portType>
<wsdl:binding name="OrderInfoSoapBinding" type="impl:OrderInfo">
  <wsdlsoap:binding style="rpc" transport="http://schemas.xmlsoap.org/soap/http" />
    <wsdl:operation name="placeOrder">
      <wsdlsoap:operation soapAction="" />
        <wsdl:input name="placeOrderRequest">
          <wsdlsoap:body
            encodingStyle="http://schemas.xmlsoap.org/soap/encoding/"
            namespace="http://DefaultNamespace" use="encoded" />
        </wsdl:input>
        <wsdl:output name="placeOrderResponse">
        <wsdlsoap:body
            encodingStyle="http://schemas.xmlsoap.org/soap/encoding/"
            namespace="http://localhost:8080/axis/corp-demo/OrderInfo.jws"
            use="encoded" />
        </wsdl:output>
    </wsdl:operation>
  </wsdl:binding>
  <wsdl:service name="OrderInfoService">
    <wsdl:port binding="impl:OrderInfoSoapBinding" name="OrderInfo">
      <wsdlsoap:address location="http://localhost:8080/axis/corp-demo/OrderInfo.jws" />
    </wsdl:port>
  </wsdl:service>
</wsdl:definitions>
```

What is claimed is:

1. A computer-implemented method for registering a web service at a Web Service Proxy Server computer, the method comprising:

supplying, by an administration module to a publishing module of the Web Service Proxy Server computer, the web service for a target desktop application comprises providing a Uniform Resource Locator (URL) of a Web Service Description Language (WSDL) file of the web service wherein the publishing module parses the WSDL file and identifies operations provided by the web service that are not compatible with the desktop application to determine if the web service is compatible with the target desktop application;

receiving, by the administration module from the publishing module, an error message specifying an incompatibility between the web service and the target desktop application; and making the web service compatible with the target desktop application by fixing the incompatibility in response to receiving the error message;

wherein fixing the incompatibility comprises appending the WSDL file for the web service with compatibility information about the web service and wherein the compatibility information comprises information about formatting, a communication standard, or a security policy.

2. The computer-implemented method of claim 1 wherein supplying the web service comprises supplying an operation of the web service.

3. The computer-implemented method of claim 1 wherein supplying the web service comprises providing a location of a Web Services Description Language (WSDL) file and the WSDL file includes information about the web service.

4. The computer-implemented method of claim 1 wherein supplying the web service comprises supplying the web service by using Universal Description Discovery and Integration.

5. The computer-implemented method of claim 1 wherein the error message specifies an incompatibility between an operation of the web service and an operation of the target desktop application.

6. The computer-implemented method of claim 5 wherein fixing the incompatibility comprises supplying the web service without the operation.

7. The computer-implemented method of claim 1 wherein the error message specifies an incompatibility in formatting, communication standard, or security policy between the web service and the target desktop application.

8. The computer-implemented method of claim 1 wherein fixing the incompatibility comprises supplying, to the publishing module, compatibility information for the web service.

9. A computer readable storage medium for storing instructions thereon, the instructions when executed by a processor cause the processor to perform a method for registering a web service at a Web Service Proxy Server computer, the method comprising:

supplying, by an administration module to a publishing module of the Web Service Proxy Server computer, the web service for a target desktop application comprises providing a Uniform Resource Locator (URL) of a Web Service Description Language (WSDL) file of the web service wherein the publishing module parses the WSDL file and identifies operations provided by the web service that are not compatible with the desktop application to determine if the web service is compatible with the target desktop application;

receiving, by the administration module from the publishing module, an error message specifying an incompatibility between the web service and the target desktop application; and making the web service compatible with the target desktop application by fixing the incompatibility in response to receiving the error message;

wherein fixing the incompatibility comprises appending the WSDL file for the web service with compatibility information about the web service and wherein the compatibility information comprises information about formatting, a communication standard, or a security policy.

10. The computer readable storage medium of claim 9 wherein supplying the web service comprises supplying an operation of the web service.

11. The computer readable storage medium of claim 9 wherein supplying the web service comprises providing a location of a Web Services Description Language (WSDL) file and the WSDL file contains information about the web service.

12. The computer readable storage medium of claim 9 wherein supplying the web service comprises supplying the web service by using Universal Description Discovery and Integration.

13. The computer readable storage medium of claim 9 wherein the error message specifies an incompatibility between an operation of the web service and an operation of the target desktop application.

14. The computer readable storage medium of claim 13 wherein fixing the incompatibility comprises supplying the web service without the operation.

15. The computer readable storage medium of claim 9 wherein the error message specifies an incompatibility in formatting, communication standard, or security policy between the web service and the target desktop application.

16. The computer readable storage medium of claim 9 wherein fixing the incompatibility comprises supplying, to the publishing module, compatibility information for the web service.

17. A computer-implemented method for registering a web service at a Web Service Proxy Server computer, the method comprising:

receiving, by a publishing module of the Web Service Proxy Server computer from an administration module, the web service for a target desktop application comprises receiving a Uniform Resource Locator (URL) of a Web Service Description Language (WSDL) file of the web service wherein the publishing module parses the WSDL file and identifies operations provided by the web service that are not compatible with the desktop application to determine if the web service is compatible with the target desktop application;

supplying, by the publishing module to the administration module, an error message specifying an incompatibility between the web service and the target desktop application; and receiving a solution for fixing the incompatibility;

wherein receiving the solution for fixing the incompatibility comprises receiving the WSDL file for the web service with compatibility information about the web service and wherein the compatibility information comprises information about formatting, a communication standard, or a security policy.

18. The computer implemented method of claim 17, wherein receiving the web service comprises receiving an operation of the web service.

19. The computer implemented method of claim 17, wherein receiving the web service comprises receiving a location of a Web Services Description Language (WSDL) file and the WSDL file contains information about the web service.

20. The computer implemented method of claim 17 wherein receiving the web service comprises receiving the web service by using Universal Description Discovery and Integration.

21. The computer implemented method of claim 17 wherein the error message specifies an incompatibility between an operation of the web service and an operation of the target desktop application.

22. The computer implemented method of claim 21 wherein receiving the solution comprises receiving the web service without the operation.

23. The computer implemented method of claim 17 wherein the error message specifies an incompatibility in formatting, communication standard, or security policy between the web service and the target desktop application.

24. The computer implemented method of claim 17 wherein receiving the solution comprises receiving compatibility information for the web service.

25. A computer readable storage medium for storing instructions thereon, the instructions when executed by a processor cause the processor to perform a method for registering a web service at a Web Service Proxy Server computer, the method comprising:

receiving, by a publishing module of the Web Service Proxy Server computer from an administration module, the web service for a target desktop application comprises receiving a Uniform Resource Locator (URL) of a Web Service Description Language (WSDL) file of the web service wherein the publishing module parses the WSDL file and identifies operations provided by the web service that are not compatible with the desktop application to determine if the web service is compatible with the target desktop application;

supplying, by the publishing module to the administration module, an error message specifying an incompatibility between the web service and the target desktop application; and receiving a solution for fixing the incompatibility;

wherein receiving the solution for fixing the incompatibility comprises receiving the WSDL file for the web service with compatibility information about the web service and wherein the compatibility information comprises information about formatting, a communication standard, or a security policy.

26. The computer readable storage medium of claim 25, wherein receiving the web service comprises receiving an operation of the web service.

27. The computer readable storage medium of claim 25, wherein receiving the web service comprises receiving a location of a Web Services Description Language (WSDL) file and the WSDL file contains information about the web service.

28. The computer readable storage medium of claim 25 wherein supplying the web service comprises supplying the web service by using Universal Description Discovery and Integration.

29. The computer readable storage medium of claim 25 wherein the error message specifies an incompatibility between an operation of the web service and an operation of the target desktop application.

30. The computer readable storage medium of claim 29 wherein receiving the solution comprises receiving the web service without the operation.

31. The computer readable storage medium of claim 25 wherein the error message specifies an incompatibility in formatting, communication standard, or security policy between the web service and the target desktop application.

32. The computer readable storage medium of claim 25 wherein receiving the solution comprises receiving compatibility information for the web service.

* * * * *